3,264,357
PROCESS FOR THE MANUFACTURE OF BIS-PHENOLS AND POLYPHENOLS
Reginald Francis Webb, Cambridge, and Ian Geoffrey Hinton, Great Chesterford, near Saffron Walden, England, assignors to Ciba Limited, Basel, Switzerland, a company of Switzerland
No Drawing. Filed Nov. 18, 1960, Ser. No. 70,138
Claims priority, application Great Britain, Dec. 24, 1959, 43,873/59
7 Claims. (Cl. 260—619)

The present invention provides a process for the manufacture of bisphenols and polyphenols which, as is known, are of considerable industrial importance. In particular, the relatively low-molecular bisphenols obtained by condensing a phenol with a ketone—thus, for example, the bis(para-hydroxyphenyl)-dimethylmethane, "Bisphenol A," readily accessible by condensing acetone with phenol—are important intermediates for the manufacture of curable resins, such, for example, as epoxy resins, polyester resins or certain modified phenol-formaldehyde resins. A number of variants of this method has been described in which instead of ketone other starting materials are used; for the manufacture of Bisphenol A it is possible, for example, to react isopropenyl acetate or methylacetylene with phenol. Furthermore, it has been proposed to react a halogenated unsaturated or bifunctional aldehyde or ketone with a phenol for the manufacture of polyphenols chemically related to Bisphenol A; such methods are in all cases only suitable for the manufacture of symmetrical bisphenols.

For the manufacture of bisphenols it has also been proposed to react a monomeric isopropenyl phenol with a phenol in the presence of an acidic catalyst; that method has the disadvantage that the final product is always more or less contaminated by polymerized by-products.

Surprisingly, it has now been found that the linear dimers of para-isopropenylphenol react with phenols in the presence of acidic catalysts and form the corresponding symmetrical or asymmetrical bisphenols. The dimers of para-isopropenylphenol are new compounds.

Accordingly, the present invention provides a process for the manufacture of phenols of the general formula

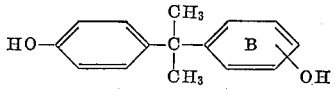

in which the benzene ring B may be substituted by one or several hydrocarbon radicals, hydroxyarylalkyl radicals or hydroxyl groups and/or by a condensed aromatic or hydroaromatic ring, wherein in the presence of an acidic catalyst a dimer of isopropenylphenol of the isomeric formula

II

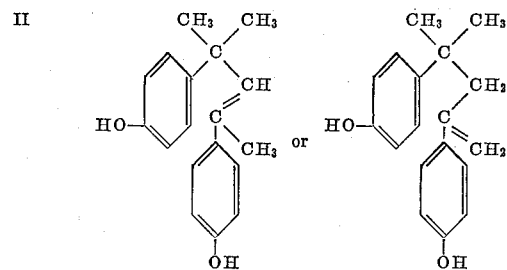

is reacted with a phenol of the general formula

III

where B' in the Formula III has the same meaning as B in the Formula I, with the proviso, however, that in the benzene ring concerned at least one ortho- or para-position relative to the hydroxyl group must be unsubstituted. It is worthy of mention that, as can be proved experimentally, the present process does not proceed via the monomeric isopropenylphenol as intermediate; the fact is that when the phenol of the Formula III is absent from the reaction mixture, a cyclic unsaturated bisphenol of the formula

IV

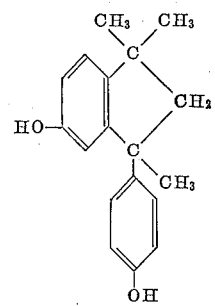

is formed.

There is no doubt that the resulting saturated cyclic phenol is formed directly from the unsaturated dimeric phenol; this is proved indirectly by the analogous course of the reaction taken in cyclising the dimers of styrene and ortho-methylstyrene (see Boundy and Boyer, "Styrene," Reinhold Publishing Corporation, 1952, chapters 15 and 18). In addition, to bring about splitting of the dimeric isopropenylbenzenes to form the monomers, they must be heated at a high temperature (see British specification No. 757,752). Surprisingly, however, the use of such high temperatures is not necessary in the process of the present invention. Compared with the known process for the manufacture of bisphenols starting from monomeric isopropenylphenol the present process offers the substantial advantage that the dimeric isopropenylphenols, in contrast to their monomers, have only little tendency to form insoluble and infusible polymerized by-products which in the case of the known process undesirably contaminate the bisphenol or polyphenol respectively in the final product.

As suitable phenols of the general Formula III there may be mentioned: ortho-, meta- and para-cresol, xylenols, ortho-, meta- and para-ethylphenol, n-propylphenols, n-butylphenols, tertiary butylphenols, 1:2:4-trimethyl-hydroxybenzenes, 1:3:5 - trimethyl - 2 - hydroxybenzene, 1:2:4:5-tetramethyl-3-hydroxybenzene, carvacrol, thymol, ortho-allylphenol, ortho-cyclohexylphenol, hydroquinone, pyrocatechol, 1-naphthol, 2-naphthol, 1:4-naphthohydroquinone, bis - (para-hydroxyphenyl) - methane, 2:2-bis-(para-hydroxyphenyl)-propane, (Bisphenol A), and more especially resorcinol and phenol themselves. Suitable acid catalysts are, for example: hydrochloric acid, sulfuric acid, phosphoric acid, strong organic acids such as para-toluenesulfonic acid, trichloroacetic acid; Lewis acids, such as tin tetrachloride, aluminum chloride and boron trifluoride; furthermore, strongly acidic ion-exchange resins such as sulfonated polystyrene. A preferred acid catalyst is gaseous hydrogen chloride.

The temperature range preferably used for the performance of the reaction of the invention is —10 to +150° C. If desired, the reaction can be performed in the presence of an inert solvent, such as an alcohol, for example methanol, ethanol or propanol; a chlorinated hydrocarbon such as chlorobenzene, dichlorobenzene, chloroform, methylenedichloride or trichlorethylene; or a hydrocarbon, for example benzene, heavy gasoline, hexane or cyclohexane.

In certain cases it is possible to use a large excess of the phenol of the general Formula III over and above the stoichiometric proportion required for reaction with the dimer of the Formula II, in which case the excess phenol acts at the same time as solvent for the reaction.

Some of the symmetrical or asymmetrical bisphenols and polyphenols of the Formula I prepared by the present process are very suitable as antioxidants. Furthermore, they can be converted into the corresponding glycidyl ethers by treating them in known manner with epichlorohydrin or glycerol dichlorohydrin in the presence of an alkali. The resulting epoxy resins can be used either as such or in admixture with other epoxy resins—for example the glycidyl ethers derived from phenol novolaks, resorcinol novolaks or polyalcohols—as moulding compositions, casting resins, laminating resins or adhesives, or for the manufacture of such products. As is known, such resins can be converted into tough, infusible cured products of good chemical resistance by treating them with a conventional curing agent for epoxy resins such, for example, as a polycarboxylic acid anhydride or an amine.

Parts in the following examples are by weight.

EXAMPLE 1

(a) *Manufacture of dimeric para-isopropenylphenol [4-methyl-2:4-bis(para-hydroxyphenyl)-pent-1-ene and -2-ene]*

250 parts of para-isopropenylphenol are suspended in 1500 parts of boiling cyclohexane. After a few minutes the suspended solid substance is converted into a yellow oil which in the course of 60 hours solidifies again to form a white crystalline product. The reaction mixture is allowed to cool and the supernatant cyclohexane solution is decanted and evaporated to dryness to yield only traces of a solid white substance. The latter product is comminuted and dried; it consists predominantly of 4-methyl-2:4-bis-(para-hydroxyphenyl)-pent-1-ene and -2-ene [molecular weight=268]. After having been recrystallized from cyclohexane the product melts at 128–132° C. On hydrogenation 0.98 molecular proportion of hydrogen for every 268 grams of the product is taken up. Hydroxyl number: 1.9 OH-groups for every 268 grams.

*Analysis.*—Found: C, 80.4%; H, 7.5%. Calculated for $C_{18}H_{20}O_2$: C, 80.6%; H, 7.5%.

The infra-red absorption spectrum displays bands at 895 cm.$^{-1}$ (—C=CH$_2$), 810 cm.$^{-1}$ (—C=CH) and 830 cm.$^{-1}$ (para-disubstituted benzene nucleus).

(b) *Manufacture of bis-(para-hydroxyphenyl)-dimethylmethane [Bisphenol A]*

120 parts of dimeric para-isopropenylphenol and 1200 parts of phenol are melted together and the reaction solution is saturated with hydrogen chloride gas and heated for one hour at 100° C. The excess phenol is then expelled by steam distillation, to leave 190 parts of a solid residue (yield 93% of the theoretical, calculated on isopropenylphenol) consisting of 2:2-bis-(para-hydroxyphenyl)-propane [Bisphenol A]. Recrystallization from trichloroethylene yields pure Bisphenol A of melting point or mixed melting point respectively 150° C.

EXAMPLE 2

*Manufacture of (meta-methyl-para-hydroxyphenyl)-(para-hydroxyphenyl)-dimethylmethane [3-methyl-Bisphenol A]*

250 parts of ortho-cresol and 25 parts of dimeric para-isopropenylphenol are melted together; the reaction solution is saturated with hydrogen chloride gas and maintained for one hour at 100° C. The product is then subjected to steam distillation, to leave 41.5 parts of a pale pinkish powder consisting predominantly of 3-methyl-Bisphenol A which is identical with the product prepared from monomeric isopropenylphenol and ortho-cresol.

EXAMPLES 3 to 58

The procedure used in these examples—numerical details are listed in the following table—is in each case as follows: A mixture consisting of dimeric para-isopropenylphenol, the phenol used in the individual case, and a possibly used solvent is heated until the reaction mixture is homogeneous. The catalyst is then added and the mixture is maintained in each case for one hour at the indicated temperature. The catalyst is then removed either by steam distillation or by being washed out with alkali or by filtration, whereupon the solvent and unreacted phenol are expelled by steam distillation. The residue is collected and dried in air. In these examples the following final products were obtained:

| Example No. | Final product |
| --- | --- |
| 3 | 2-(4'-hydroxy-1'-naphthyl)-2-(4"-hydroxyphenyl)-propane. |
| 4 | 2-(4'-hydroxy-2'-methylphenyl)-2-(4"-hydroxyphenyl)-propane. |
| 5 | 2-(2'-hydroxy-5'-methylphenyl)-2-(4"-hydroxyphenyl)-propane. |
| 6 | 2-(2'-hydroxynaphthyl)-2-(4"-hydroxyphenyl)-propane. |
| 7 | 4':4"-dihydroxy-3'-phenyl-2:2-diphenylpropane. |
| 8 | 1,3,3-trimethyl-1-(p-hydroxyphenyl)-indan-6-ol. |
| 9 | 1,3,3-trimethyl-1-(p-hydroxyphenyl)-indan-6-ol. |
| 10 | 2-(4'-hydroxy-3':5'-dimethylphenyl)-2-(4"-hydroxyphenyl)-propane. |
| 11 | 2-(4'-hydroxy-2':3'-trimethylphenyl)-2-(4"-hydroxyphenyl)-propane. |
| 13–58 | 4':4"-hydroxy-2:2-diphenylpropane. |

The melting point of the product of Example 3 is that of the recrystallized product.

| Example No. | Weight of Dimer (grams) | Phenol and weight used (grams) | Solvent (10 ml.) | Reaction Temp. (° C.) | Catalyst and amount used | Product Yield (grams) | Product Nature | Product M.P. (° C.) |
| --- | --- | --- | --- | --- | --- | --- | --- | --- |
| 3 | 10 | α-Naphthol, 107 | | 90 | HCl gas, satd | 23.0 | Cryst | 187 |
| 4 | 10 | m-Cresol, 110 | | 90 | do | 7.7 | Resin | |
| 5 | 10 | p-Cresol, 110 | | 90 | do | 10.4 | do | |
| 6 | 10 | β-Naphthol, 150 | | 90 | do | 14.0 | do | |
| 7 | 10 | o-Phenylphenol, 130 | | 90 | do | | do | |
| 8 | 10 | o-Nitrophenol,* 140 | | 90 | do | | do | |
| 9 | 10 | p-Chlorophenol,* 130 | | 90 | do | 7.2 | do | |
| 10 | 5 | 2:6-dimethylphenol, 50 | | 90 | do | | do | |
| 11 | 4 | 2:3-dimethylphenol, 50 | | 90 | do | | do | |
| 12 | 1 | 2:3:4:5-tetramethylphenol, 10 | | 90 | do | | do | |
| 13 | 1 | Phenol, 10 | | 40 | Conc. HCl, 1 ml | 1.3 | Cryst | 152–4 |
| 14 | 1 | do | | 40 | Conc. H$_2$SO$_4$, 1 ml | 1.0 | Cryst | 152–4 |
| 15 | 1 | do | | 40 | Syrupy phosphoric acid, 1 ml | 0.9 | Cryst | 150–2 |
| 16 | 1 | do | | 40 | p-Toluene-sulfonic acid, 1 g | 1.1 | Cryst | 150–2 |
| 17 | 1 | do | | 40 | Trichloroacetic acid, 1 g | 1.1 | Cryst | 151.4 |
| 18 | 1 | do | | 40 | "Dowex" 50W x 8 (sulfonated polystyrene), 10 g. | 1.1 | Cryst | 149–3 |
| 19 | 1 | do | | 40 | BF$_3$ etherate, 1 ml | 1.4 | Cryst | 149–51 |
| 20 | 1 | do | | 40 | HCl gas, satd | 1.5 | Cryst | 148–50 |
| 21 | 1 | do | | 40 | Glacial acetic acid, 1 ml | | Resin | |
| 22 | 1 | do | | 40 | Dil. HCl, 1 ml | 0.3 | Cryst | 138–40 |
| 23 | 1 | do | Benzene | 81 | HCl gas, satd | 1.2 | Cryst | 138–40 |
| 24 | 1 | do | do | 20 | do | 1.2 | Cryst | 142–4 |
| 25 | 1 | do | Trichloroethylene | 75 | do | 0.7 | Cryst | 136–8 |

| Example No. | Weight of Dimer (grams) | Phenol and weight used (grams) | Solvent (10 ml.) | Reaction Temp. (° C.) | Catalyst and amount used | Product | | |
|---|---|---|---|---|---|---|---|---|
| | | | | | | Yield (grams) | Nature | M.P. (° C.) |
| 26 | 1 | Phenol, 10 | Trichloroethylene | 20 | HCl gas, satd | 1.5 | Cryst. | 137-9 |
| 27 | 1 | ____do____ | Chloroform | 61 | ____do____ | 1.4 | Cryst. | 146-8 |
| 28 | 1 | ____do____ | ____do____ | 20 | ____do____ | 1.2 | Cryst. | 146-8 |
| 29 | 1 | ____do____ | Ether | 40 | ____do____ | 1.3 | Cryst. | 140-2 |
| 30 | 1 | ____do____ | ____do____ | 20 | ____do____ | 1.4 | Cryst. | 148-50 |
| 31 | 1 | ____do____ | Chlorobenzene | 100 | ____do____ | 1.3 | Cryst. | 147-9 |
| 32 | 1 | ____do____ | ____do____ | 20 | ____do____ | 1.4 | Cryst. | 140-2 |
| 33 | 1 | ____do____ | Cyclohexane | 80 | ____do____ | 1.4 | Cryst. | 148-50 |
| 34 | 1 | ____do____ | ____do____ | 20 | ____do____ | 1.2 | Cryst. | 149-51 |
| 35 | 1 | ____do____ | Petroleum (B.P., 60-80° C.). | 70 | ____do____ | 1.2 | Cryst. | 142-4 |
| 36 | 1 | ____do____ | ____do____ | 20 | ____do____ | 1.2 | Cryst. | 149-51 |
| 37 | 1 | ____do____ | Methanol | 65 | ____do____ | 1.5 | Cryst. | 136-8 |
| 38 | 1 | ____do____ | ____do____ | 20 | ____do____ | 1.3 | Cryst. | 137-9 |
| 39 | 1 | ____do____ | Water | 100 | ____do____ | 1.3 | Cryst. | 135-7 |
| 40 | 1 | ____do____ | ____do____ | 20 | ____do____ | 0.8 | Cryst. | 149-51 |
| 41 | 1 | ____do____ | Acetone | 56 | ____do____ | 2.3 | Cryst. | 140-2 |
| 42 | 1 | ____do____ | ____do____ | 20 | ____do____ | 6.2 | Cryst. | 128-30 |
| 43 | 1 | ____do____ | | 100 | ____do____ | 1.4 | Cryst. | 143-5 |
| 44 | 1 | ____do____ | | 20 | ____do____ | 1.4 | Cryst. | 143-51 |
| 45 | 1 | Phenol, 0.5 | Trichloro-ethylene. | 70 | ____do____ | | Resin | 75 |
| 46 | 1 | Phenol, 1 | ____do____ | 70 | ____do____ | 1.2 | Cryst | 130-45 |
| 47 | 1 | Phenol, 2 | ____do____ | 70 | ____do____ | 1.6 | Cryst | 150-4 |
| 48 | 1 | Phenol, 4 | ____do____ | 70 | ____do____ | 1.7 | Cryst | 150-4 |
| 49 | 1 | Phenol, 8 | ____do____ | 70 | ____do____ | 1.6 | Cryst | 151-3 |
| 50 | 1 | Phenol, 1 | Methanol | 70 | ____do____ | | Resin | |
| 51 | 1 | Phenol, 2 | ____do____ | 70 | ____do____ | | ___do___ | |
| 52 | 1 | Phenol, 4 | ____do____ | 70 | ____do____ | 1.4 | Cryst | 135 |
| 53 | 1 | Phenol, 8 | ____do____ | 70 | ____do____ | 1.3 | Cryst | 134 |
| 54 | 1 | Phenol, 1 | | 40 | ____do____ | 1.5 | Cryst | 146 |
| 55 | 1 | Phenol, 1 | | 40 | ____do____ | 1.6 | Cryst | 142 |
| 56 | 1 | Phenol, 2 | | 40 | ____do____ | 1.6 | Cryst | 145 |
| 57 | 1 | Phenol, 4 | | 40 | ____do____ | 1.8 | Cryst | 145 |
| 58 | 1 | Phenol, 16 | | 40 | ____do____ | 1.7 | Cryst | 152 |

*To not react.

EXAMPLE 59

7 kg. of commercial resorcinol, 548 grams of dimetric para-isopropenylphenol and 2 liters of methanol are melted together at 70° C. and the melt is saturated with hydrogen chloride gas. The mixture is refluxed for 3 hours at 105° C. The solvent is then distilled off in a vacuum of 40 mm. Hg to establish an internal temperature in the distillation vessel of 110° C. The residue is allowed to cool overnight and divided into portions of 250 cc. each. Each portion is agitated first with 2 liters of water and then with 2 liters of chloroform; by this agitation treatment a total of 99 grams of a solid white substance is caused to separate in floccular form. The substance is collected, washed with boiling chloroform and recrystallized five times from aqueous methanol of 50% strength, whereupon it displays in an evacuated melting tube a melting point of 270 to 272° C. This substance is a polyphenol having a chemical constitution which was not examined in detail; by treatment with epichlorhydrin and sodium hydroxide it can be converted into its glycidyl ether.

The chloroform solutions obtained by agitating each fraction of 250 cc. are washed twice with 2 liters of water on each occasion, then combined and evaporated. The resulting residue is an oil which forms a crystalline magma when stirred with trichloroethylene; it is crude 2′:4′:4″-trihydroxy-2:2-diphenylpropane (165 grams). After recrystallization from aqueous methanol of 50% strength the product melts in an evacuated melting tube at 199° C.

From the trichloroethylene mother liquor 62 grams of phenol and 40 grams of meta-dimethoxybenzene can be recovered by fractional distillation. The aqueous layers obtained by agitating each portion of 250 cc. are each washed twice with 2 liters of chloroform on each occasion and then combined. Unreacted resorcinol can be recovered from these combined aqueous solutions by evaporation.

What is claimed is:
1. Process for the manufacture of phenols of the general formula

I 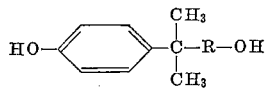

wherein R is a radical selected from the group consisting of phenylene, hydroxyphenyloxy, monoalkylphenylene, dialkylphenylene, trialkylphenylene, tetraalkylphenylene, alkenylphenylene, cycloalkylphenylene, a r y l - phenylene, naphthylene, hydroxynaphthylene, and (hydroxyphenyl alkyl)-phenylene radical with the proviso that said radical R is free from substituents selected from the group consisting of halogen and nitro, wherein a product which is a mixture of the isomeric forms having the formulae II 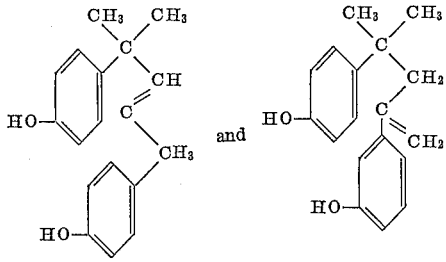

is condensed in the presence of a strong acidic catalyst with a phenol of the formula

III               H—R—OH wherein R has the same meaning as above, with the proviso that the H atom and the —OH group are bound to the same benzene nucleus and are in a position selected from the group consisting of ortho and para relative to each other.

2. Process as claimed in claim 1, wherein phenol itself is used as phenol (III).

3. Process as claimed in claim 1, wherein resorcinol is used as phenol (III).

4. Process as claimed in claim 1, wherein hydrogen chloride gas is used as catalyst.

5. Process as claimed in claim 1, wherein the reaction is carried out within a temperature range of $-10°$ to $+150°$ C.

6. Process as claimed in claim 1, wherein the reaction is performed in the presence of an inert solvent.

7. Process as claimed in claim 1, wherein an excess of the phenol (III) used as starting material serves also as solvent.

References Cited by the Examiner

UNITED STATES PATENTS 2,858,343  10/1958  Hoaglin et al. _____ 260—619
2,882,322  4/1959  Griffin et al. _____ 260—619

OTHER REFERENCES

Corson et al.: Jour. Organic Chem., vol. 23, p. 549 (1958).

German application No. 1,004,168, Jacobs, published March 1957.

LEON ZITVER, *Primary Examiner.*

CHARLES B. PARKER, *Examiner.*

HAROLD G. MOORE, M. B. ROBERTO, D. M. HELFER, *Assistant Examiner.*